Jan. 1, 1952          G. H. TEMTE          2,580,484

JET-PROPELLED AIRPLANE

Filed Dec. 23, 1948          4 Sheets-Sheet 1

INVENTOR.
GLENN H. TEMTE
BY Paul, Paul & Moore
ATTORNEYS

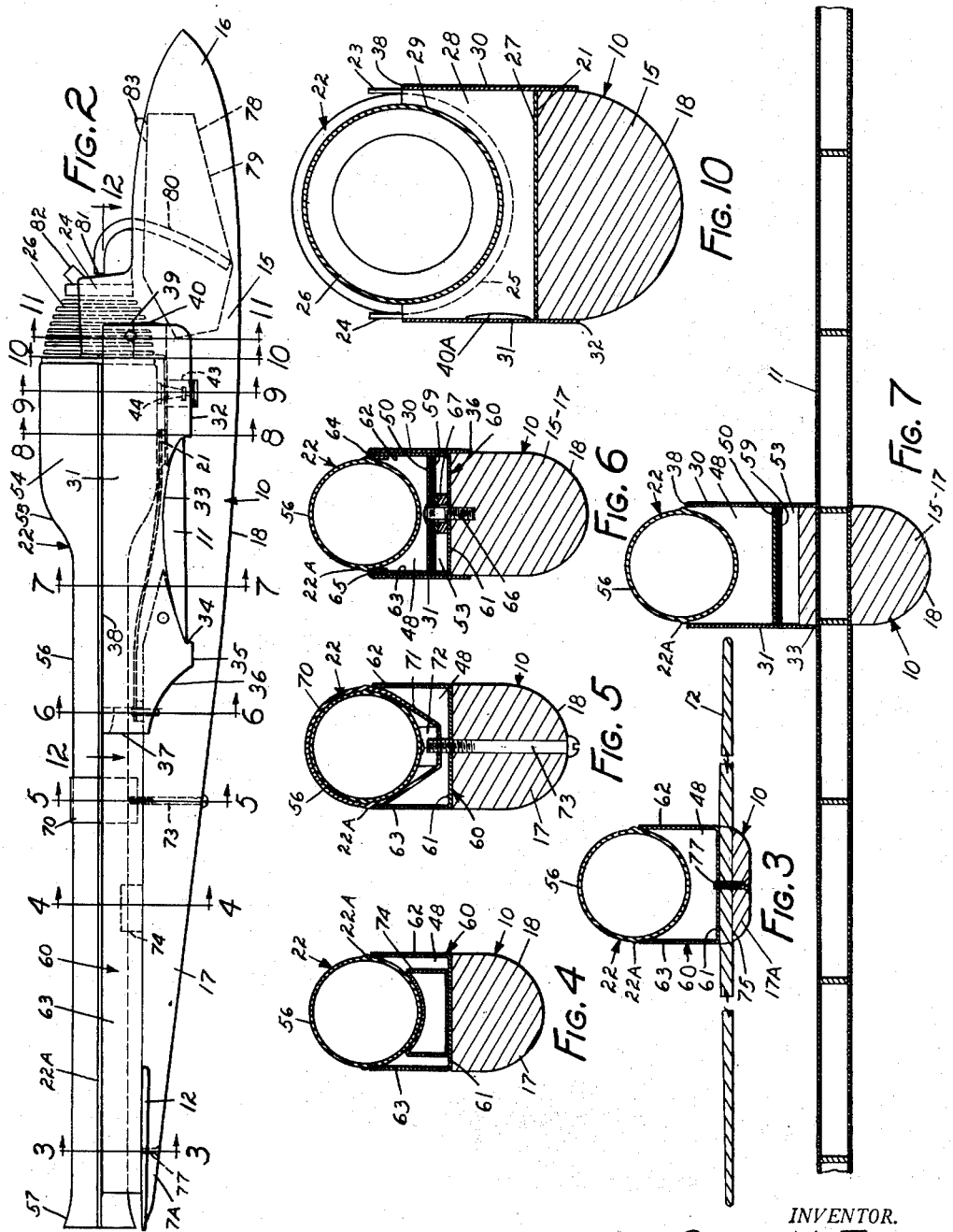

Jan. 1, 1952          G. H. TEMTE         2,580,484
JET-PROPELLED AIRPLANE
Filed Dec. 23, 1948                        4 Sheets-Sheet 3
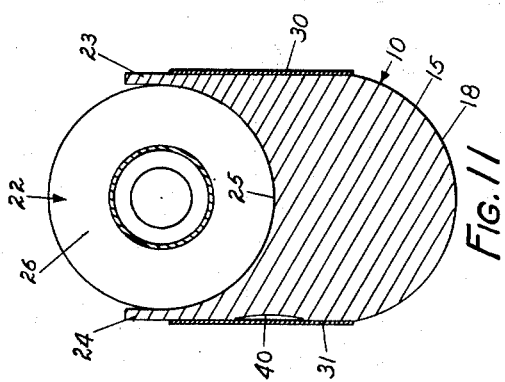
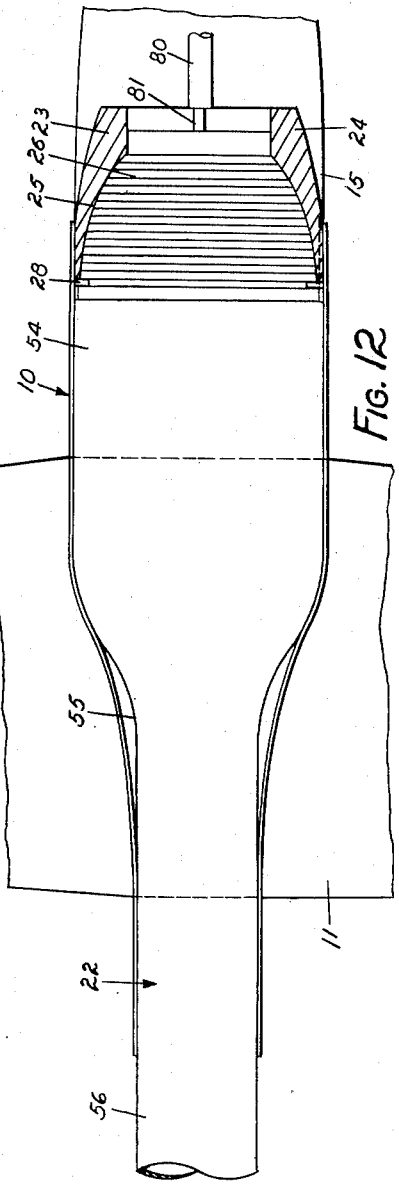
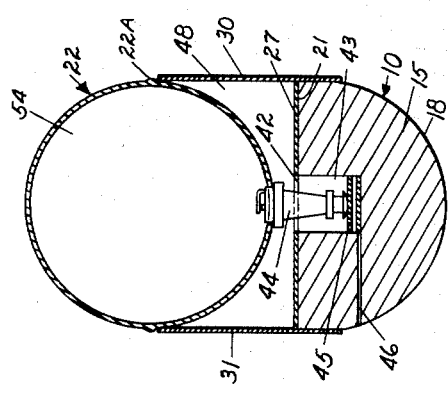
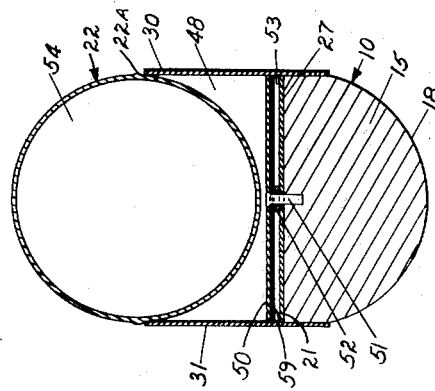
INVENTOR.
GLENN H. TEMTE
BY Paul, Paul & Moore
ATTORNEYS Jan. 1, 1952  G. H. TEMTE  2,580,484
JET-PROPELLED AIRPLANE
Filed Dec. 23, 1948  4 Sheets-Sheet 4
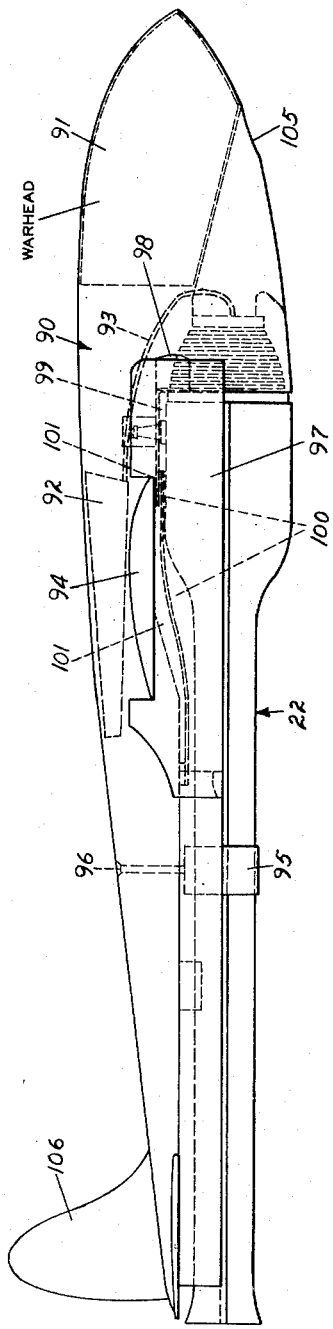
INVENTOR.
GLENN H. TEMTE
BY Paul, Paul & Moore
ATTORNEYS Patented Jan. 1, 1952

2,580,484

UNITED STATES PATENT OFFICE 2,580,484

JET-PROPELLED AIRPLANE

Glenn H. Temte, Minneapolis, Minn.

Application December 23, 1948, Serial No. 66,938

11 Claims. (Cl. 244—74)

This invention relates to airplane constructions wherein the propulsive unit is a jet engine having an extended jet exhaust tube. In such airplane constructions the jet propulsive unit is of such a size that it must occupy a relatively large amount of space in the airplane, as compared with engines of conventional design, and this has occasioned considerable difficulty in design. In addition, jet propulsive units commonly operate at high temperatures and accordingly provision must be made for cooling such propulsive units while in operation, and for protecting the airplane construction from high temperatures and at the same time afford adequate cooling for the propulsive unit.

It is an object of the invention to provide an improved airplane construction wherein the propulsive unit is of the jet type having an extended tail pipe.

It is also an object of the invention to provide an improved airplane construction adapted for use in model airplanes and also adapted for use in larger aircraft, such as passenger-carrying aircraft, target airplanes, military aircraft, guided missiles and the like.

It is another object of the invention to provide an improved airplane construction wherein a part of the jet tube of the propulsive device forms the shell or outline of the airplane, this part being directly exposed to the surrounding air to provide adequate jet tube cooling without increasing the drag of the airplane.

It is another object of the invention to provide an improved airplane fuselage-wing-propulsive unit assembly wherein the propulsive unit is partially enclosed and partially exposed and in which adequate cooling is at all times provided for the jet propulsive unit of the construction and an overall shape of smooth aerodynamic design is provided.

It is another object of the invention to provide an airplane construction wherein the propulsive unit is partly enclosed and partly exposed along a longitudinal line through the propulsive unit, and adequate flow of cooling air is provided for the enclosed sections of the propulsive unit.

It is another object of the invention to provide an improved construction wherein the propulsive unit may be readily attached and detached from the remaining portions of the airplane construction and to provide an improved, economical, strong, light and rugged airplane construction unit utilizing a jet engine having a jet tube, as the propulsive unit of the assembly.

Other and further objects of the invention are those inherent in the apparatus herein illustrated, described and claimed.

The invention is illustrated with reference to the drawings in which corresponding numerals refer to the same parts and in which:

Figure 2 is a side view of an aircraft of the present invention;

Figure 1:
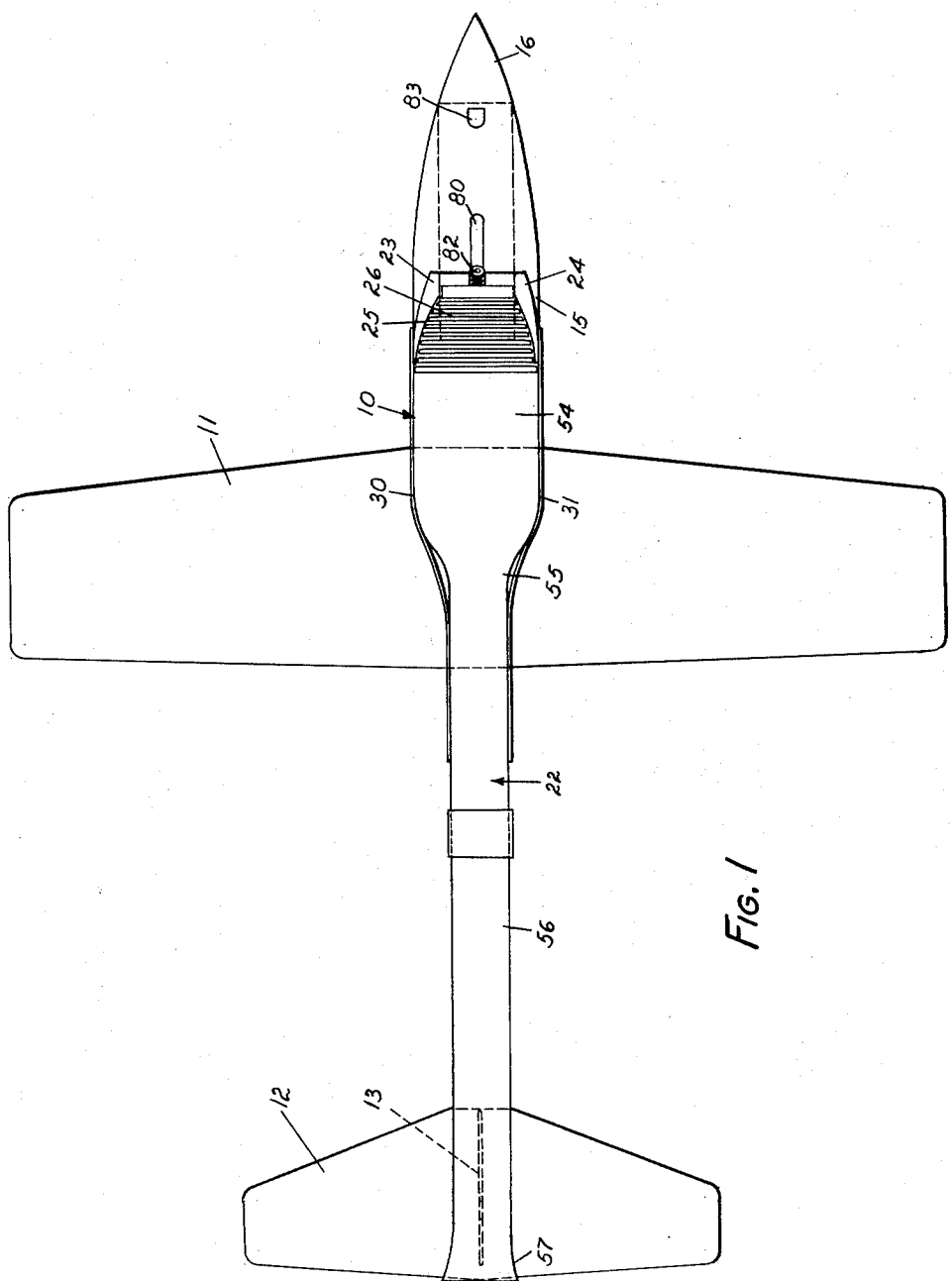
Figure 1 is a plan view of an aircraft of the present invention.

Figures 3, 4, 5, 6, 7, 8, 9, 10 and 11 are transverse sectional views taken, respectively, along the lines and in the direction of arrows 3—3, 4—4, 5—5, 6—6, 7—7, 8—8, 9—9, 10—10 and 11—11 of Figure 2;

Figure 12 is a fragmentary longitudinal sectional view taken along the line and in the direction of arrows 12—12 of Figure 2;

Figure 13 is a side elevational view of an exemplary form of the instant invention;

Figure 14 is a side elevational view of another exemplary form of the instant invention.

Referring to Figures 1–12, particularly, the model size airplane therein illustrated includes a fuselage section generally designated 10 to which the wing 11 and tail 12 and other appendages are attached. In some types of airplanes, particularly in control line model airplanes no rudder is provided, but where a rudder is desired it is attached to the assembly along the line 13 of Figure 1 and as also illustrated in Figures 13 and 14.

The fuselage 10 of the airplane construction comprises a longitudinal body section 15 and a forward tapered or nose section 16 and a rearwardly tapered tail portion 17. In Figures 1–12 this portion 15 of the fuselage is indicated as of solid construction, as for a model airplane, but it will be understood that member 15–16–17 of the airplane may be of frame construction covered by any suitable surfacing material, either fabric or metal. In general the fuselage portion 15–16–17 has a curved outer portion 18 which forms either the lower part of the fuselage (as in Figures 1–12) or the upper part of the fuselage (as in Figures 13 and 14). The fuselage section 15 is shaped along one side (which is the upper side in Figures 1–12 and the lower side in Figures 13 and 14) so as to form an enclosing channel into which the jet propulsive unit generally designated 22 is adapted to be seated and partially closed.

The propulsive unit 22 illustrated in the instant application, in and of itself forms no part of the present invention, save only as its overall shape is utilized in and contributes to the configuration and attributes of the airplane assembly. The propulsive unit 22, per se, is illustrated and disclosed in the copending application of William L. Tenney and Charles B. Marks Serial No. 649,882 filed February 25, 1946. This propulsive unit may also take the shape of a tube of constant diameter except for an expanding exhaust nozzle when desired.

In the exemplary forms of the invention shown herein the channel into which the propulsive unit is seated is composed partly of the member 15 and partly of a plurality of pieces of metal. Thus, at the forward end of the fuselage 15 there are upwardly extending shaped fins 23 and 24 at either side somewhat tapered together in the forward and upward direction to form a smoothly curved seat 25 into which the forward portion of the propulsive unit 22 is seated. The portions 23—24 extend up to or above the center line of the propulsive unit and may entirely cover the forward end of the propulsive unit 22 so as to form a socket into which the forward (or inlet) end 26 is either seated or nested. This portion of the device is illustrated in the sectional view, Figure 11.

The next change in section occurs at Figure 10 at which member 15-16-17, which forms the main frame of the fuselage, is cut down to the level 21 and at this point there is attached a metal protective piece 27 which has an upstanding metal fin 28 having a semi-circular notch 29 in its upper edge. The metal fin 28 is attached to and stiffens and is supported by the side plates 30 and 31 which are attached at their lower edges to the fuselage structure 15. The metal side plates 30—31 begin just ahead of section line 11—11 in Figure 1 and extend rearwardly along each side of the airplane fuselage. They are defined at their lower edges by the line 32 which is straight and thence follows along a curved line 33 which is the shape of the wing where the wing spar extends through the fuselage section 15. Thence, the metal plates 30—31 continue around the trailing edge of the wing at the notch 34 and thence continue along the straight line 35, which blends into the curved section line 36. The plates 30 and 31 are then bounded at their rear ends by the line 37 which extends up to approximately the longitudinal center line of the propulsive unit 22, the upper portion of the plates 30—31 being indicated by the line 38 which extends forwardly and closes with the front edge line 39.

Where the plate 31 overlaps the side portion 24 of the fuselage there is provided an air inlet passage 40 into which air rushes as the aircraft moves forwardly. The air inlet passage enters into a ventilating space 48 immediately behind the supporting fin 28 which is notched at 40A (Figure 10) so as to continue the passage 40 (Figure 11). This space 48 is adjacent the combustion zone 54, which is the hottest portion of the propulsive unit and hence the introduction of air into the under side of the propulsive unit serves to cool this portion of the propulsive unit.

Another view of the combustion zone 54 is illustrated by Figure 9 wherein it will be observed that the floor plate 27 is provided with a central aperture 42 and the fuselage portion 15 is bored out at 43 so as to provide a recess into which the spark plug 44 of the propulsive unit is adapted to extend. In this connection it will be noted that the model size airplane requires a spark plug (for starting only) which is relatively large as compared to the entire assembly. Hence, a recess is provided to enclose it. In larger aircraft space is ordinarily available without making a specific recess. At the bottom of the recess 43 there is a spring washer 45 with which the terminal of the spark plug is adapted to make contact and from the spring washer there extends outwardly an electrical connection 46 for temporarily attaching an ignition lead wire for starting the operation of the propulsive unit. It will be understood that once the propulsive unit is started the ignition wire which is temporarily attached at the terminal 46 may then be disconnected and the unit thereafter operates without external ignition.

In Figure 9 the space 48 below the propulsive unit 22 is a ventilating space and the cooling air which has entered by means of the port 40 is adapted to pass through this space for cooling the under half of the propulsion unit.

The next change in section of the design occurs at line 8—8 of Figure 1, this section being shown in Figure 8. At this section it will be noted that a second plate 50 is provided in spaced relation over the floor plate 27, these plates being held by means of the screw 51, the spacing being maintained by means of a spacing washer 52 or other suitable spacer. The ventilating air flowing through the space 48 (Figure 9) is thus divided into two streams, part of which flows above plate 50 through the continuation of the space 48 and part through the slit 53 between the plates 27 and 50. The plate 50 is curved upwardly as shown in Figure 2 to the elevation shown in Figure 7, which is approximately three-fourths the way back along the wing structure. At this next section (line 7—7) the main portion 10 of the fuselage has narrowed and the side plates 30 and 31 are likewise curved in. It may be noted that the propulsive unit 22, which is illustrated, has an enlarged combustion chamber 54 at its forward end and that the combustion chamber is connected by the converging section 55 to a tail pipe 56 of smaller and substantially constant diameter throughout the major portion of its length, the tail pipe being flared slightly at its rearmost portion 57, as shown in Figure 2. At the forward end of the propulsive unit there is provided the air and fuel inlet section 26 to which reference has already been made. The side plates 30 and 31 and the fuselage portion 15-16-17 are shaped so as to conform to the changes in diameter of the particular propulsive unit that is used. Where the propulsive unit has a tail pipe which is equal in diameter to the combustion chamber thereof, the side plates and fuselage are conformed thereto.

It will be noted from Figure 2 that the floor plate 27 of Figures 9 and 10 terminates slightly beyond the point at which the spaced plate 50 begins and that the wing spar, which passes through the fuselage portion 15, is at this point protected by the plate 50 which is spaced from the combustion section of the propulsive unit 22 and also spaced from the wing. The cooling air flowing along in the space 53 beneath the plate 50 adequately cools the upper surface of the wing 11 and thus prevents any fire hazard or deterioration due to excessive heating. Below the plate 50 there may be provided a layer of insulating material, as shown at 59, Figures 6 and 7. The heat insulation 59 serves as additional protection to the upper portion of the wing elements 11 and any exposed portion of the lower fuselage section 15-16-17. At section 6, shown in Figure 6, the plate 50 and insulation 59 are terminated and this also serves to terminate the ventilating space 53.

Slightly behind section 6 side plates 30—31 are also terminated and here they are joined to a sheet metal channel generally designated 60. The channel 60 has a flat portion 61 which is attached to the fuselage section 15—17 and upstanding side portions 62 and 63 which are gripped by the bent over top portion 64 and 65 at the rear end of the side plates 30 and 31. In this manner the attachment of the side plates 30—31 to the channel 60 is made firmly and at the same time the common upper edges 38 of the side plates and the upper edges of the flanges 62—63 of the channel 60 form a seat along which the major axis of the propulsive unit is adapted to engage. The channel 60, the plate 50 and the insulating sheet 59 are held to the fuselage section 15—17 by means of the screw 66 (Figure 6) and the spacing of the plates is maintained by means of the washer 67.

At section 5 (Figure 5) there is provided a clamping device in the form of a ring 70 which encircles the propulsive device 22. The ring is shaped so as to provide a downwardly extending part 71 into which a threaded block 72 is seated. A long fastening screw 73 passes through the portion 17 of the fuselage member and through the web 61 of the channel 60 and into the block 72 where it is threaded. As the screw 73 is turned it pulls the block 72 downwardly and thus pulls downwardly on the ring 70, thus drawing the entire propulsive unit 22 downwardly and firmly into engagement with the upper edges of the side flanges 62 and 63 of the channel 60. It will also be noted that the location of the clamping ring 70 is approximately midway along the length of the propulsive unit, as shown in Figure 2, and hence the downward pull of the ring 70 also pulls the forward and rearward end of the propulsive unit downwardly into clamping engagement on the upper edges of the side walls.

Somewhat behind the clamp, as shown at section 4 in Figure 4, there is provided a step block 74 which is in the form of a shaped open metal framework. The step block serves to space the rear portion of the propulsive unit 22 from the floor 61 of the channel 60.

At the tail end of the aircraft, as shown in Figures 2 and 3, the lower portion 17 has been tapered out to a thin section at 17A. This section is slotted at 75 so as to provide a space through which the tail strut 12 passes. The tail piece 12 is thus clamped between the portions 17A of the fuselage and the overlying channel 60 and is thus held firmly in place. Suitable securing means may, if desired, be added in the form of rivets or screws 77.

The form of propulsive unit illustrated at 22 has a slight protruding fin at 22A along each side at its mid-section. This fin forms a seat against which the upper portions of the channel members 62—63 are adapted to seat and against which the upper portions of the side plates 30—31 are adapted to seat at the forward portion of the airplane.

The front end 16 of the fuselage section 10 is hollowed out as at 78 and into the hollowed out portion 78 there is seated a fuel reservoir 79 from which the fuel line 80 extends to the fuel inlet 81 of the propulsive device. A starting air inlet at 82 is also provided on the propulsive device and an air inlet 83 of the fuel tank is likewise provided, the latter being directed so as to receive an air blast as the entire aircraft moves through the air during propulsion. In this way a positive pressure is applied to the fuel in order to aid in balancing any positive pressure in the engine induction system caused by the air blast during propulsion.

The type of aircraft shown in Figures 1–12 is particularly adapted for the model aircraft and target aircraft field, however the invention is not limited to these fields and may be used for larger aircraft and guided missiles by utilizing larger sized propulsive units. Likewise, as shown in Figure 1–12, the propulsive unit is mounted on the upper portion of the aircraft and forms the upper portion of the fuselage, but this likewise is not an essential feature of the invention. Thus, the upper portion of the aircraft may be formed by what is the lower portion 10 of Figure 2. The forms of aircraft just referred to are shown in Figures 13 and 14, to which attention is now directed.

In Figure 13 the propulsive unit 22 is of the same general character as shown in Figures 1–12, except that it may be larger and in this illustrative form it composes the lower portion of the aircraft. In this exemplary form of the invention the front of the fuselage portion 90 forms the upper part of the aircraft and at its forward end is hollowed out to receive a warhead 91, as where the device is used as a guided missile. The front is also hollowed out to enclose the front end of the propulsion unit and to improve streamlining, a suitable front air inlet port 105 being provided to allow combustion air to reach the propulsive unit. The fuel tank is, in this form of the invention, carried in a hollow portion 92 of the fuselage and is connected by the fuel line 93 to the forward end of the propulsive unit 22. The wing at 94 passes through the fuselage section 90 below the tank and is suitably attached thereto. The propulsive unit may be held to the fuselage in any suitable manner, as by means of the clamping ring 95 and attachment screw 96. The essential features of the exemplary form shown in Figure 13 are that approximately one-half of the propulsive unit from the longitudinal median plane through the unit and downwardly therefrom is exposed, whereas the upper half is enclosed in a space formed by the side plates 97 at either side of the fuselage, air for cooling this space being introduced by one or more air slits 98 at the forward end of the fuselage. The air passage 98 is as described at 40 for Figure 11 and the air so introduced is carried along through the space 99 and thence partly through the slit 100 and partly through the slit 101 so as to cool the enclosed half of the combustion chamber and at the same time provide a flow of air adjacent the wing 94 for preventing destruction thereof. If desired, the port 98 may be eliminated and the cooling air supplied from inlet passage 105. The flow of air then continues as in Figures 1–12 and is exhausted from the enclosed space between the combustion unit and the fuselage adjacent the tail of the aircraft.

In Figure 14 there is another illustrative form of the invention wherein the warhead is replaced by a pilot space 102. The forward end of the aircraft in Figure 14 is shaped at 103 so as to provide a better air foil section, and an air inlet is provided at 104 for introducing the combustion air into the propulsive unit 22. For such aircraft there may also be included landing wheels 108 which are mounted on streamlined frame members 109 which extend downwardly from the fuselage of the aircraft. A streamlined tail skid is also included at 110 to protect the flare 111 of the jet propulsion unit during take off and landing.

All of the illustrative forms of the invention have in common the idea of mounting the jet propulsion unit so that approximately one-half of the jet propulsion unit is exposed and approximately one-half is enclosed, the line between the enclosed and exposed portions being the approximate longitudinal center plane through the combustion unit.

In the forms of invention shown in Figures 13 and 14 a rudder is provided as at 106 in Figure 13 and 107 in Figure 14.

As many apparently widely different embodiments of this invention may be made without departing from the spirit and scope thereof, it is to be understood that I do not limit myself to the specific embodiments herein.

What I claim is:

1. An aircraft component wherein the propulsive unit is an elongated jet engine having a combustion chamber and a jet exhaust pipe extending therefrom, said engine attaining a high temperature during operation, the improvement comprising an aircraft component shaped so as partially to embrace and enclose said elongated jet engine within said component of the aircraft, the engine being otherwise directly exposed, the portion of the engine which is enclosed being divided from the portion exposed by a plane of division extending longitudinally through at least the major part of the length of the engine combustion chamber and exhaust pipe, and an air passageway through the aircraft, said passageway being at least partly defined by the enclosed portion of the elongated jet engine and an air inlet and air outlet for said passageway.

2. An aircraft having an elongated fuselage and wing and tail appendages attached thereto, an elongated jet engine having a combustion chamber and extended jet exhaust tail pipe mounted on the fuselage in a position such that the engine extends longitudinally of the aircraft fuselage, said fuselage being shaped so as to enclose a portion of the circumference of said elongated jet engine throughout a substantial part of the length thereof, said engine tail pipe terminating adjacent the aircraft tail, said engine being partially exposed throughout at least a substantial part of the engine length, the portion of the fuselage enclosing said portion of the engine being shaped so that an air passageway through the aircraft is formed, said passageway walls being formed in part by the enclosed part of the engine and in part by the shaped enclosing portion of the fuselage and air inlet into said passageway and an air outlet therefrom.

3. An aircraft having a fuselage, having a forward end and a tail, a wing attached to the fuselage intermediate said forward end and tail, said fuselage being characterized in that it has an air passage groove therein extending longitudinally from the forward end of the fuselage to the tail thereof and extending throughout the major part of the length of the fuselage, said groove in the fuselage including outwardly extending groove walls, each wall having an outer edge and an elongated jet engine having a combustion space and jet exhaust tube extending therefrom, said jet engine being shaped so as to nest between said groove walls with the jet exhaust tube extending substantially to the tail of the aircraft, said jet engine having a girth sufficient to close off the space from the edge of one wall to the edge of the other wall throughout a substantial part of the length of the walls but not to fill said groove, whereby the unfilled portion of the groove forms an internal air passage through the structure, and an air inlet opening into said passage and an air outlet therefrom.

4. The apparatus of claim 3 further characterized in that a baffle is provided in the deepest portion of said groove, said baffle extending lengthwise along the groove adjacent the portions of the engine where the greatest temperature of operation of the engine occurs, said baffle being positioned so as to divide the groove into parallel passageways, one adjacent the engine and one away from the engine.

5. The apparatus of claim 3 further characterized in that the jet engine exhaust extends from a position ahead of the wing to a position behind the tail, and a baffle in the groove through a portion of the length thereof where the wing is attached to the fuselage.

6. A jet propelled aerodynamic device of the class of load carrying aircraft, target airplanes, guided missiles, and model aircraft having a fuselage, wing and tail characterized in that the jet propulsion unit is an elongated jet engine having a combustion chamber with a jet exhaust tube extending therefrom, said elongated jet engine having a length equal to a major part of the fuselage length, said fuselage having a groove therein, said groove including a pair of outwardly extending groove walls each having an outer edge, said jet engine being nested into the groove, the outer edges of said walls of the groove being shaped so as to contact said jet propulsion device at a lengthwise plane of division therethrough so as to enclose one lengthwise side of the propulsion unit from approximately end to end thereof, the depth of the lengthwise groove being such that it is not filled by the engine nested therein, and an air inlet into the unfilled portion of the groove near the forward end thereof and an air outlet near the tail end thereof.

7. The apparatus of claim 6 further characterized in that the jet propulsion device forms the upper portion of the aerodynamic device.

8. The apparatus of claim 6 further characterized in that the jet propulsion device forms the lower portion of the aerodynamic device.

9. A fuselage sub-assembly for jet propelled air flight devices shaped at a wing section for attaching a wing thereto and shaped at a tail section for attaching a tail assembly thereto comprising an elongated aerodynamic shape and characterized in that it has an aerodynamic nose section and a groove extending from adjacent the wing section to beyond the tail section thereof, said groove being defined in part by outwardly extending wall members of heat resistant materials.

10. The fuselage sub-assembly of claim 9 further characterized in that the groove is composed of metal.

11. The fuselage sub-assembly of claim 10 further characterized in that apertures are provided through the aerodynamic shape at the wing section and tail section thereof for insertion of wing and tail airfoils directly therethrough, said outwardly extending wall members being continuous across said apertures.

GLENN H. TEMTE.

REFERENCES CITED

The following references are of record in the file of this patent:

UNITED STATES PATENTS

| Number | Name | Date |
|---|---|---|
| 1,782,753 | Wheeler | Nov. 25, 1930 |
| 1,814,556 | Jewett | July 14, 1931 |
| 1,888,749 | Urquhart | Nov. 22, 1932 |
| 2,432,359 | Streid | Dec. 9, 1947 |

OTHER REFERENCES

"Flight," pages 364, 365, issue of October 5, 1944.